United States Patent
Park et al.

(10) Patent No.: US 9,633,477 B2
(45) Date of Patent: Apr. 25, 2017

(54) WEARABLE DEVICE AND METHOD OF CONTROLLING THEREFOR USING LOCATION INFORMATION

(71) Applicant: LG ELECTRONICS INC., Seoul (KR)

(72) Inventors: Sihwa Park, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/490,393

(22) Filed: Sep. 18, 2014

(65) Prior Publication Data

US 2016/0035135 A1 Feb. 4, 2016

(30) Foreign Application Priority Data

Aug. 1, 2014 (KR) .................. 10-2014-0099029

(51) Int. Cl.
| | | |
|---|---|---|
| *G06T 19/00* | (2011.01) | |
| *G02B 27/01* | (2006.01) | |
| *G06F 3/01* | (2006.01) | |
| *G06F 3/0482* | (2013.01) | |
| *G06F 3/03* | (2006.01) | |

(52) U.S. Cl.
CPC .......... *G06T 19/006* (2013.01); *G02B 27/017* (2013.01); *G02B 27/0172* (2013.01); *G02B 2027/014* (2013.01); *G02B 2027/0138* (2013.01); *G02B 2027/0178* (2013.01); *G02B 2027/0187* (2013.01); *G06F 3/011* (2013.01); *G06F 3/012* (2013.01); *G06F 3/013* (2013.01); *G06F 3/017* (2013.01); *G06F 3/0304* (2013.01); *G06F 3/0482* (2013.01)

(58) Field of Classification Search
CPC .......... G02B 2027/0178; G02B 20/017; G02B 27/0172; G02B 2027/014; G02B 2027/0138; G02B 2027/0187; G02B 2/017; G02B 2027/01877; G06F 3/011; G06F 3/012; G06F 3/013; G06F 3/017; G06F 3/0304; G06F 3/0482; G06T 19/006
USPC ......... 345/156, 158, 174, 633; 704/235, 270
See application file for complete search history.

(56) References Cited

U.S. PATENT DOCUMENTS

| 8,743,145 B1 | 6/2014 | Price | |
|---|---|---|---|
| 2009/0003662 A1* | 1/2009 | Joseph | ................ H04N 1/0045 382/118 |
| 2012/0021806 A1 | 1/2012 | Maltz | |

(Continued)

FOREIGN PATENT DOCUMENTS

JP 2013-44832 A 3/2013

*Primary Examiner* — Jin-Cheng Wang
(74) *Attorney, Agent, or Firm* — Birch, Stewart, Kolasch & Birch, LLP

(57) ABSTRACT

The present specification relates to a wearable device and a method of controlling therefor. According to one embodiment, a method of controlling a wearable device includes the steps of detecting a real object and displaying a first virtual object based on the detected real object when the real object is detected, and detecting the real object and a first interaction and displaying a second virtual object when the real object and the first interaction are detected, wherein the second virtual object is displayed based on the second virtual object information transmitted by the external device.

18 Claims, 14 Drawing Sheets

(56) References Cited

U.S. PATENT DOCUMENTS

| | | | |
|---|---|---|---|
| 2013/0044130 A1* | 2/2013 | Geisner | G09G 5/00 345/633 |
| 2013/0050262 A1 | 2/2013 | Jeon | |
| 2013/0242262 A1 | 9/2013 | Lewis | |
| 2013/0335301 A1* | 12/2013 | Wong | G02B 27/0093 345/8 |
| 2014/0081634 A1* | 3/2014 | Forutanpour | G06F 17/289 704/235 |
| 2014/0160157 A1 | 6/2014 | Poulos et al. | |
| 2014/0306994 A1* | 10/2014 | Brown | G06T 19/006 345/633 |
| 2014/0362111 A1* | 12/2014 | Kim | G06T 19/006 345/633 |
| 2015/0205494 A1* | 7/2015 | Scott | G06F 3/04842 345/158 |
| 2015/0235422 A1* | 8/2015 | Lohse | G06T 19/006 345/633 |
| 2015/0302867 A1* | 10/2015 | Tomlin | G10L 25/48 704/270 |

\* cited by examiner

WEARABLE DEVICE AND METHOD OF CONTROLLING THEREFOR USING LOCATION INFORMATION

This application claims the benefit of the Korean Patent Application No. 10-2014-0099029, filed on Aug. 1, 2014, which is hereby incorporated by reference as if fully set forth herein.

BACKGROUND OF THE INVENTION

Field of the Invention

The present specification relates to a wearable device and a method of controlling therefor.

Discussion of the Related Art

Recently, the use of a wearable device is increasing. A smart watch, a head mounted display device and the like are used as the wearable device. And, a smart lens as a wearable device of a lens form has appeared recently. In this case, the wearable device includes a display unit and may provide visual information to a user via the display unit. In case that the wearable device provides the user with the visual information, the wearable device may provide visual information corresponding to a real object to the user as a virtual object. As users using a wearable device are increasing, a plurality of users may exchange necessary information with each other while wearing the wearable device. Hence, it is required to have a method of disclosing information between a plurality of the users using the wearable device.

SUMMARY OF THE INVENTION

An object of the present specification is to provide a wearable device and a method of controlling therefor.

Another object of the present specification is to provide a method for a wearable device to detect a real object and display a virtual object based on the detected real object.

Another object of the present specification is to provide a method for a wearable device to detect a real object and an interaction of the real object and display a virtual object based on the real object and the interaction of the real object.

Another object of the present specification is to provide a method for a wearable device to transmit virtual object information to an external device.

Another object of the present specification is to provide a method for a wearable device to detect a gesture input and an audio input as an interaction of a real object.

Another object of the present specification is to provide a method for a wearable device to transmit virtual object information to an external device based on stored address information.

Another object of the present specification is to provide a method for a wearable device to receive location information of the wearable device and set information property of a virtual object based on the location information.

The other object of the present specification is to provide a method for a wearable device to store name card information based on virtual object information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, according to one embodiment, a wearable device includes a display unit configured to display a virtual object, a first camera unit configured to detect a real object from the front direction of the wearable device, a communication unit configured to transmit first virtual object information to an external device based on the detected real object and receive second virtual object information from the external device and a processor configured to control the display unit, the first camera unit and the communication unit. In this case, the processor display a first virtual object based on the detected real object when the real object is detected, and display a second virtual object when the real object and a first interaction are detected, wherein the second virtual object corresponds to a virtual object displayed based on the second virtual object information transmitted by the external device.

To achieve these objects and other advantages and in accordance with the purpose of the invention, as embodied and broadly described herein, according to one embodiment, a method of controlling a wearable device includes the steps of detecting a real object and displaying a first virtual object based on the detected real object when the real object is detected, and detecting the real object and a first interaction and displaying a second virtual object when the real object and the first interaction are detected, wherein the second virtual object is displayed based on the second virtual object information transmitted by the external device.

According to the present specification, it is able to provide a wearable device and a method of controlling therefor.

According to the present specification, a wearable device detects a real object and may display a virtual object based on the detected real object.

According to the present specification, a wearable device detects a real object and an interaction of the real object and may display a virtual object based on the detected real object and the interaction of the real object.

According to the present specification, a wearable device may provide a method of transmitting virtual object information to an external device.

And, a wearable device may detect a gesture input and an audio input as an interaction of a real object.

And, a wearable device may transmit virtual object information to an external device based on stored address information.

And, a wearable device receives location information of the wearable device and may set information property of a virtual object based on the location information.

And, a wearable device may provide a method of storing name card information based on virtual object information.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

While embodiments have been described in detail with reference to the attached drawings and contents written on the drawings, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, a terminology, each of which includes such an ordinal number as first, second and the like, may be used to describe various components. In doing so, the various components should be non-limited by the corresponding terminologies, respectively. The terminologies are only used for the purpose of discriminating one component from other components. For instance, a first component may be named a second component while coming within the scope of the appended claims and their equivalents. Similarly, the second component may be named the first component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and may be implemented by hardware, software or a combination thereof.

Figure 1:
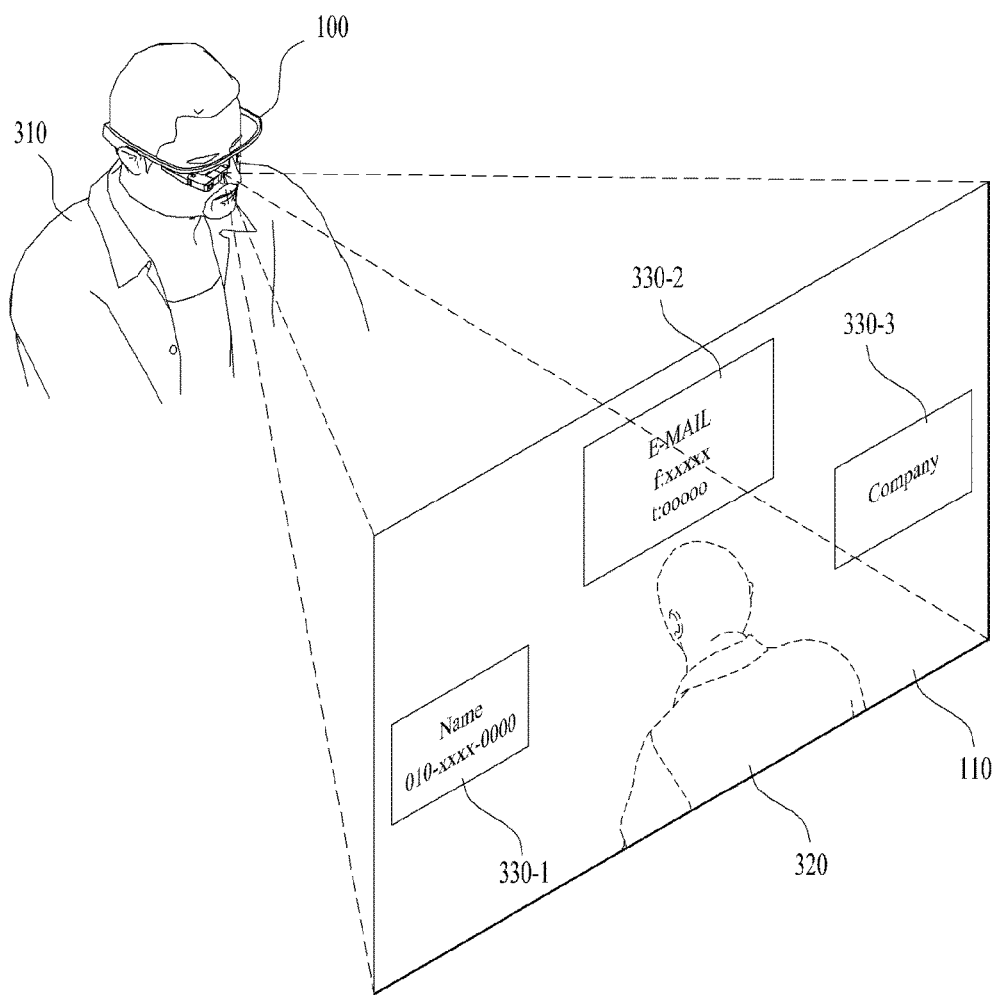
FIG. 1 is a diagram for a wearable device displaying a virtual object according to one embodiment of the present specification.

FIG. 1 is a diagram for a wearable device displaying a virtual object according to one embodiment of the present specification. A wearable device 100 may be worn on a user. And, the wearable device 100 includes a display unit 110 and may display visual information. In this case, as an example, the visual information may correspond to a virtual object. More specifically, the wearable device 100 may include a see-through display unit 110. In particular, in case that the wearable device 100 is mounted on a user, the user may see a real object through the see-through display unit 110. In this case, as an example, the real object may correspond to an actually existing object such as a person, an object and the like. The wearable device 100 may display a virtual object corresponding to the real object. More specifically, the wearable device 100 may display the virtual object in a position corresponding to the real object in the display unit 110. In this case, as an example, the virtual object may correspond to an object related to the real object. As an example, if the real object corresponds to a vehicle, the wearable device 100 may display a type of the vehicle, moving speed of the vehicle and the like as the virtual object. And, as an example, if the real object corresponds to a person, the wearable device 100 may display name of the person, nationality of the person and the like as the virtual object. In particular, the wearable device 100 may display the virtual object corresponding to the real object. By doing so, the wearable device 100 may provide information on the real object to the user. In this case, as an example, the virtual object may correspond to a graphic user interface provided to the user by the display unit 110. In this case, the wearable device 100 may display the virtual object in the display unit 110 using an augmented reality technology. And, as an example, the virtual object may correspond to a 2D or a 3D image. Besides, the virtual object may correspond to an image providing visual information to the user, by which the present specification may be non-limited.

As an example, referring to FIG. 1, a first user 310 wearing the wearable device 100 may detect a second user 320 corresponding to a real object. In this case, the first user 310 may detect the second user 320 through a see-through display unit 110. In this case, the wearable device 100 may display virtual objects 330-1/330-2/330-3 corresponding to the second user 320 based on the second user 320. In this case, as an example, a first virtual object 330-1 may correspond to a virtual object including a name and telephone number information of the second user 320. And, a second virtual object 330-2 may correspond to a virtual object including E-mail and SNS information of the second user 320. And, a third virtual object 330-3 may correspond to a virtual object including company information of the second user 320. In particular, if the wearable device 100 detects the second user 320 corresponding to the real object, the wearable device may display the virtual objects 330-1/330-2/330-3 related to the second user 320.

Figure 2A:
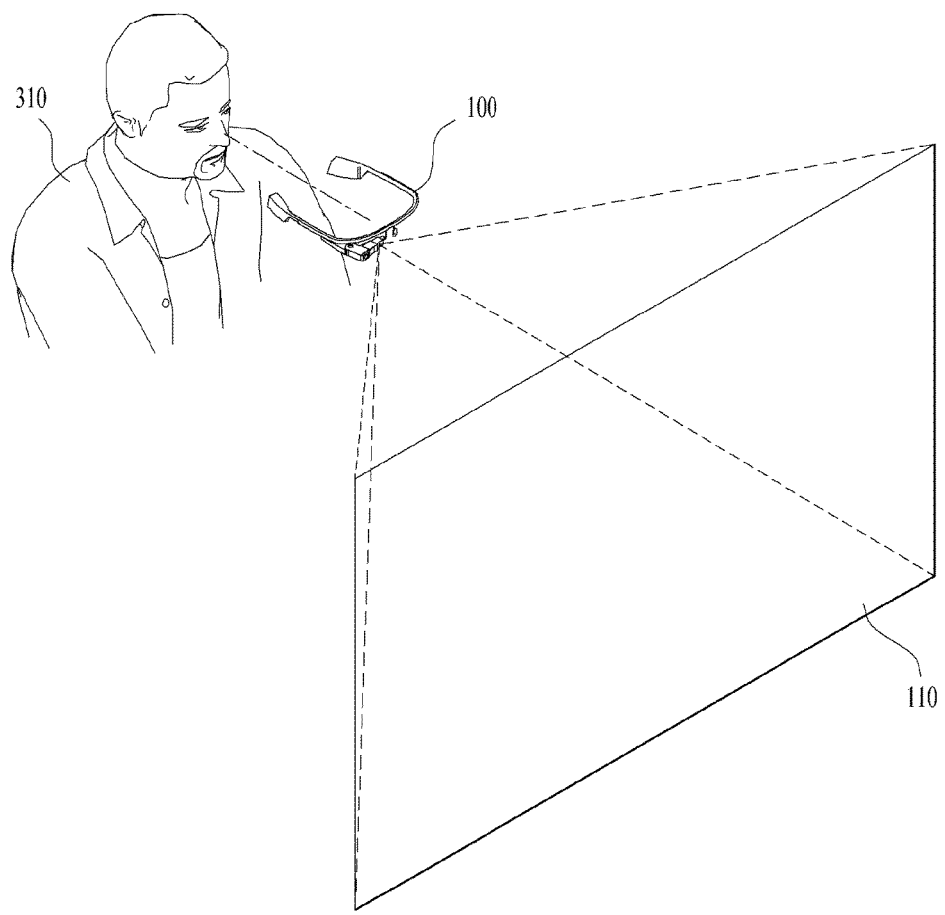
FIG. 2a and FIG. 2b are diagrams of a method for a wearable device to display visual information according to one embodiment of the present specification.
Figure 2B:
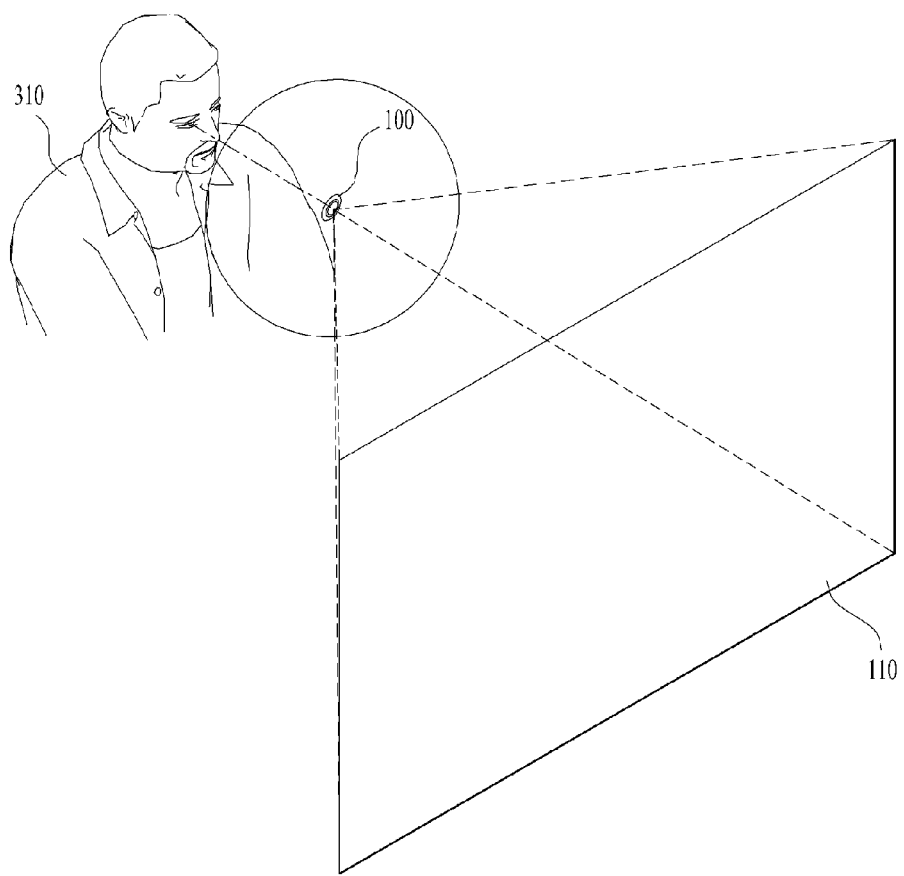

FIG. 2a and FIG. 2b are diagrams of a method for a wearable device to display visual information according to one embodiment of the present specification. The wearable device 100 may be worn on a user. And, the wearable device 100 may provide visual information to the user via the display unit 110. In this case, as an example, the wearable device 100 may correspond to a head mounted display device (hereinafter abbreviated HMD device). And, as an example, the wearable device 100 may correspond to a smart lens. As a different example, the wearable device 100 may correspond to a smart watch, a device of a necklace type or the like. In particular, the wearable device 100 may correspond to a device worn on a user 310, by which the present specification may be non-limited.

As an example, referring to FIG. 2a, the wearable device may correspond to an HMD device. In this case, the HMD device 100 has a form of glasses and may be worn on a user. The user wears the HMD device 100 like glasses and may see visual information provided by the HMD device 100. As a different example, referring to FIG. 2b, the wearable device 100 may correspond to a smart lens. In this case, the smart lens may be manufactured by a lens form. And, a virtual object may be displayed via a lens in a manner that micro parts are concentrated on the lens. In particular, in case that a user wears the smart lens, the user detects a real object via the lens and may display a virtual object corresponding to the real object on the surface of the lens.

Figure 3:
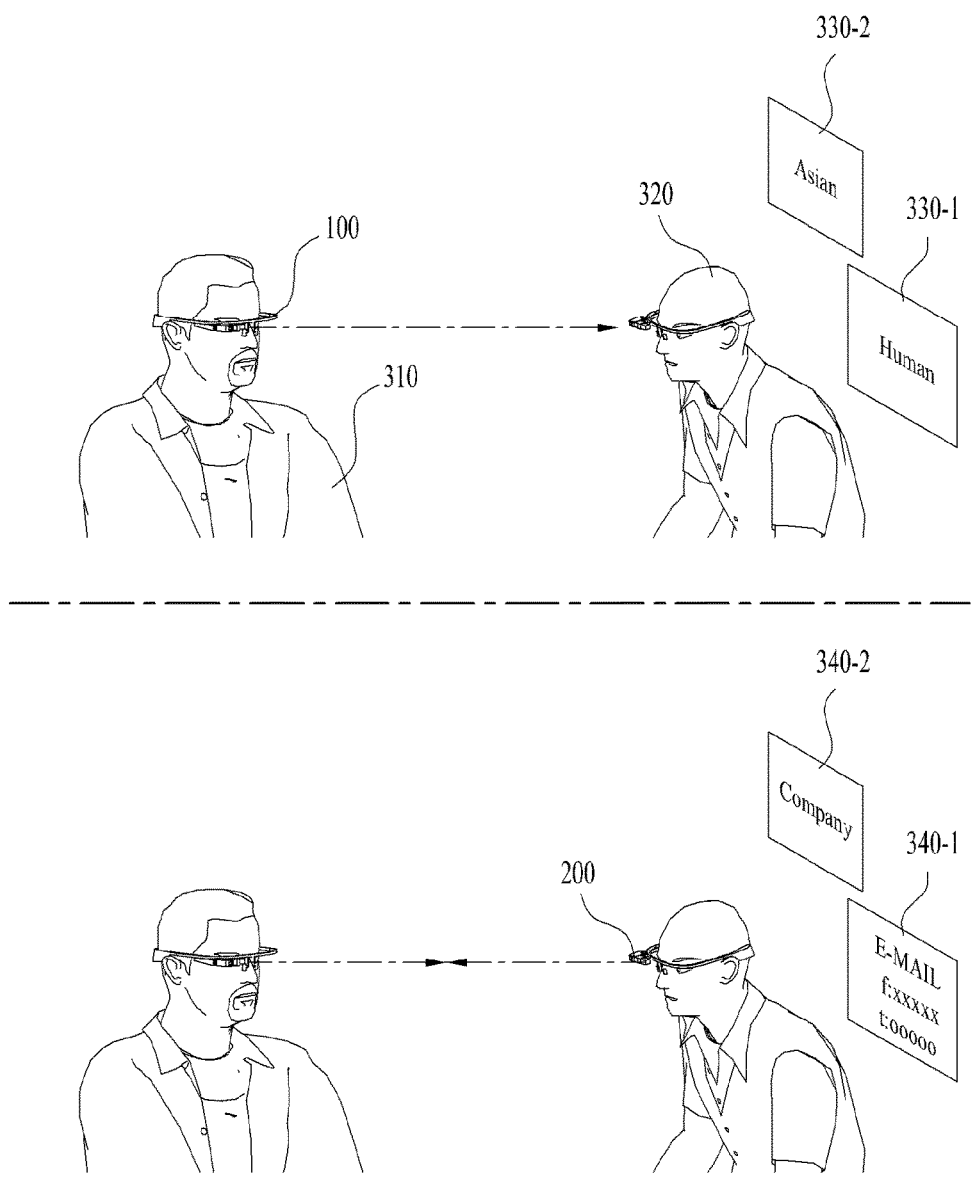
FIG. 3 is a diagram of a method for a wearable device to display a virtual object based on an interaction of a real object according to one embodiment of the present specification.

FIG. 3 is a diagram of a method for a wearable device to display a virtual object based on an interaction of a real object according to one embodiment of the present specification.

The wearable device 100 detects a real object and may display a virtual object based on the detected real object. In this case, as an example, the wearable device 100 may display the virtual object based on whether the wearable device detects an interaction of the real object.

More specifically, if the wearable device detects the real object, the wearable device 100 may display a first virtual object based on the detected real object. In this case, the wearable device 100 may detect the real object only. And, if the wearable device 100 detects the real object and a first interaction of the real object, the wearable device 100 may display a second virtual object based on the detected real object. In this case, the wearable device may detect the real object and the first interaction of the real object. In this case, the first virtual object and the second virtual object may correspond to virtual objects different from each other. And, the second virtual object may correspond to a virtual object which is displayed based on virtual object information transmitted by an external device 100. In particular, the wearable device 100 may display virtual objects different from each other when the wearable device detects the real object only and the wearable device detects both the real object and the first interaction of the real object, respectively.

More specifically, referring to FIG. 3, the wearable device 100 may be worn on a first user 310. In this case, the wearable device 100 may detect a second user 320 corresponding to a real object. In this case, as an example, the wearable device 100 detects the second user 320 only corresponding to the real object and may not detect a first interaction of the second user 320. In this case, as an example, the first interaction may correspond to a voice recognition operation based on an audio input between the first and the second user. And, the first interaction may correspond to a gesture input of the first user 310 and a gesture input of the second user 320. Regarding this, it shall be described later with reference to FIG. 5a and FIG. 5b. If the wearable device 100 detects the second user 320 only corresponding to the real object, the wearable device 100 may display first virtual objects 330-1/330-2 based on the detected real object. In this case, the first virtual objects 330-1/330-2 may correspond to a virtual object which is displayed based on image information of the second user 320. More specifically, the wearable device 100 detects the second user 320 corresponding to the real object using a camera unit 120 and may capture an image. In this case, the wearable device 100 may display the first virtual objects 330-1/330-2 based on the image information of the second user 320 captured by the camera unit 120. As an example, the first virtual object 330-1 may correspond to information indicating that the second user 320 corresponds to a person. In particular, the wearable device 100 detects that the second user 320 corresponding to the real object corresponds to a person in the captured image and may display detected information as a virtual object. And, as an example, the first virtual object 330-2 may indicate a type of a person. More specifically, the wearable device 100 analyzes information on the second user 320 via an image and may display whether the second user corresponds to an Asian or a Westerner and the like. In particular, if the wearable device 100 detects a real object only, the wearable device 100 may display the first objects 330-1/330-2 based on image information of the detected real object. As an example, if the wearable device 100 detects a vehicle, the wearable device 100 may display a model of the vehicle, moving speed of the vehicle and the like as a virtual object by analyzing image information.

And, if the wearable device 100 detects the real object and the first interaction of the real object, the wearable device 100 may display second virtual objects 340-1/340-2. In this case, as an example, the first interaction of the real object may correspond to an operation that the first user 310 and the second user 320 are facing with each other. In this case, an external device 200 may be worn on the second user 320. The wearable device 100 may detect the external device 200 using the camera unit 120. By doing so, the wearable device 100 may detect the interaction as the operation that the first user 310 and the second user 320 are facing with each other. Regarding this, it shall be described later with reference to FIG. 4. If the wearable device 100 detects the real object and the first interaction of the real object, the wearable device 100 may display the second virtual objects 340-1/340-2. In this case, as an example, the second virtual objects 340-1/340-2 may correspond to virtual objects which are displayed based on virtual object information transmitted by the external device 200. More specifically, the external device 200 may correspond to a wearable device of a type identical to or compatible with the wearable device 100. In this case, the second user 320 may transmit the virtual object information to the wearable device 100 mounted on the first user 310 based on the first interaction. In particular, the second user 320 may transmit the virtual object information, which is the information of the second user, to the wearable device 100 via the external device 200 based on the first interaction. In this case, as an example, the virtual object information may correspond to information including one selected from the group consisting of name information, telephone number information, company information, E-mail information, SNS information of the second user 320. And, the virtual object information may correspond to information of which the second user 320 intends to disclose, by which the present specification may be non-limited. If the external device 200 transmits the virtual object information to the wearable device 100 of the first user 310, the wearable device 100 may display the second virtual objects 340-1/340-2 based on the received virtual object information. In particular, the wearable device 100 may display the virtual objects based on the second user 320 corresponding to the real object and the first interaction of the second user 320.

And, as an example, if the wearable device 100 detects a real object only, the wearable device 100 may not display a virtual object. In this case, if the wearable device 100 further detects an interaction of the real object, the wearable device 100 may display the virtual object. In particular, the wearable device 100 may display the virtual object only when the wearable device detects the real object and the interaction of the real object only.

Figure 4:
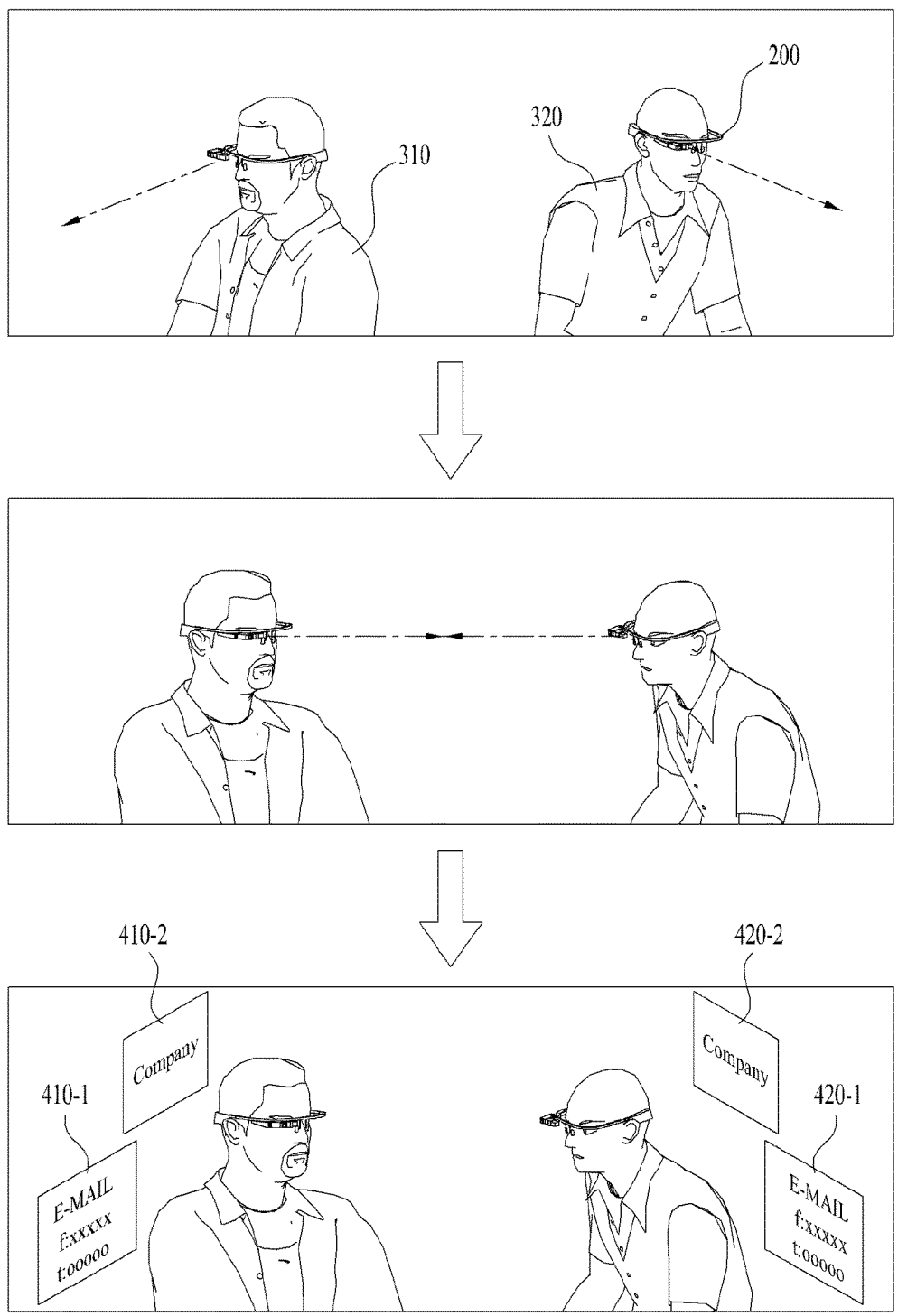
FIG. 4 is a diagram of a method for a wearable device to detect a real object and an interaction of the real object according to one embodiment of the present specification.

FIG. 4 is a diagram of a method for a wearable device to detect a real object and an interaction of the real object according to one embodiment of the present specification.

The wearable device 100 may detect a real object and a first interaction of the real object. In this case, the wearable device 100 may be worn on a first user 310. And, the real object may correspond to a second user 320. In this case, as an example, the first interaction of the real object may correspond to an interaction between the first user 310 and the second user 320. As an example, if the first user 310 and the second user 320 are facing with each other, the wearable device 100 may detect the first interaction of the real object. In particular, the wearable device 100 may detect a state that the first user 310 and the second user 320 are facing with each other as the first interaction. More specifically, an external device 200 may be worn on the second user 320. And, the wearable device 100 includes a first camera unit and the external device 200 may include a second camera unit. In this case, as an example, the wearable device 100 may detect the front direction of the second camera unit of the external device 200 using the first camera unit. In this case, if the front direction of the second camera unit is facing at the front direction of the first camera unit, the wearable device 100 may detect the first interaction. In particular, if the first user 310 and the second user 320 are facing with each other, the wearable device 100 may detect the first interaction. And, as an example, the external device 200 may detect the front direction of the first camera unit of the wearable device 100 using the second camera unit. In this case, if the front direction of the first camera unit is facing at the front direction of the second camera unit, the external device 200 may detect the first interaction. In particular, the wearable device 100 and the external device 200 may detect the first interaction, respectively. In this case, the external device 200 may transmit virtual object information to the wearable device 100 based on the first interaction. The wearable device 100 may display a virtual object based on the virtual object information received from the external device 200. By doing so, the first user 310 wearing the wearable device 100 may display information on the second user 320 wearing the external device 200 based on consent of the second user.

And, if the wearable device 100 detects the first interaction, the wearable device 100 may transmit virtual object information on the first user 310 to the external device 200. In this case, the external device 200 may display a virtual object based on the virtual object information on the first user 310 received from the wearable device. In particular, the wearable device 100 and the external device 200 detect the first interaction and may share information with each other. In this case, as mentioned in the foregoing description, the wearable device 100 and the external device 200 may correspond to devices of an identical type or devices compatible with each other.

As an example, referring to FIG. 4, the first user 310 and the second user 320 may face directions different from each other. In particular, the first camera unit of the wearable device 100 and the second camera unit of the external device 200 may not face with each other. On the contrary, if the first user 310 and the second user 320 are facing with each other, the front direction of the first camera unit of the wearable device 100 may correspond to the front direction of the second camera unit of the external device 200. In this case, the wearable device 100 may detect the first interaction. In this case, the wearable device 100 may transmit first virtual object information to the external device 200 using a communication unit. And, the wearable device 100 may receive second virtual object information transmitted by the external device 200 using the communication unit. In this case, the first virtual object information may correspond to information configured by the first user 310. And, the second virtual object information may correspond information configured by the second user 320. The wearable device 100 may display first virtual objects 410-1/410-2 based on the received second virtual object information. In this case, as an example, the first virtual objects 410-1/410-2 may correspond to company information, E-mail information or SNS information of the second user 320. And, the external device 200 may display second virtual objects 420-1/420-2 based on the received first virtual object information. In this case, as an example, the second virtual objects 420-1/420-2 may correspond to company information, E-mail information or SNS information of the first user 310.

Figure 5A:
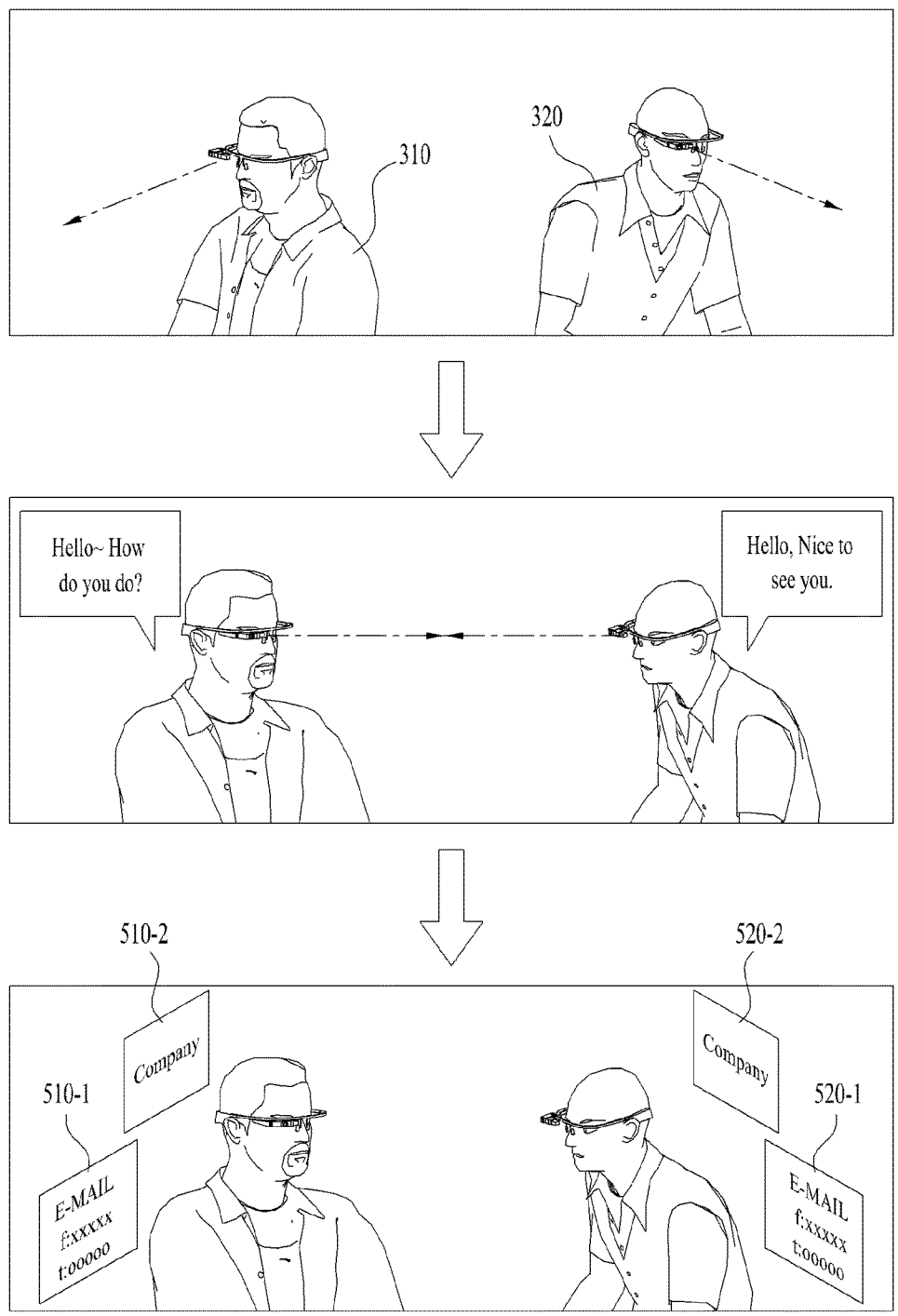
FIG. 5a and FIG. 5b are diagrams of a method for a wearable device to detect a real object and an interaction of the real object according to one embodiment of the present specification.
Figure 5B:
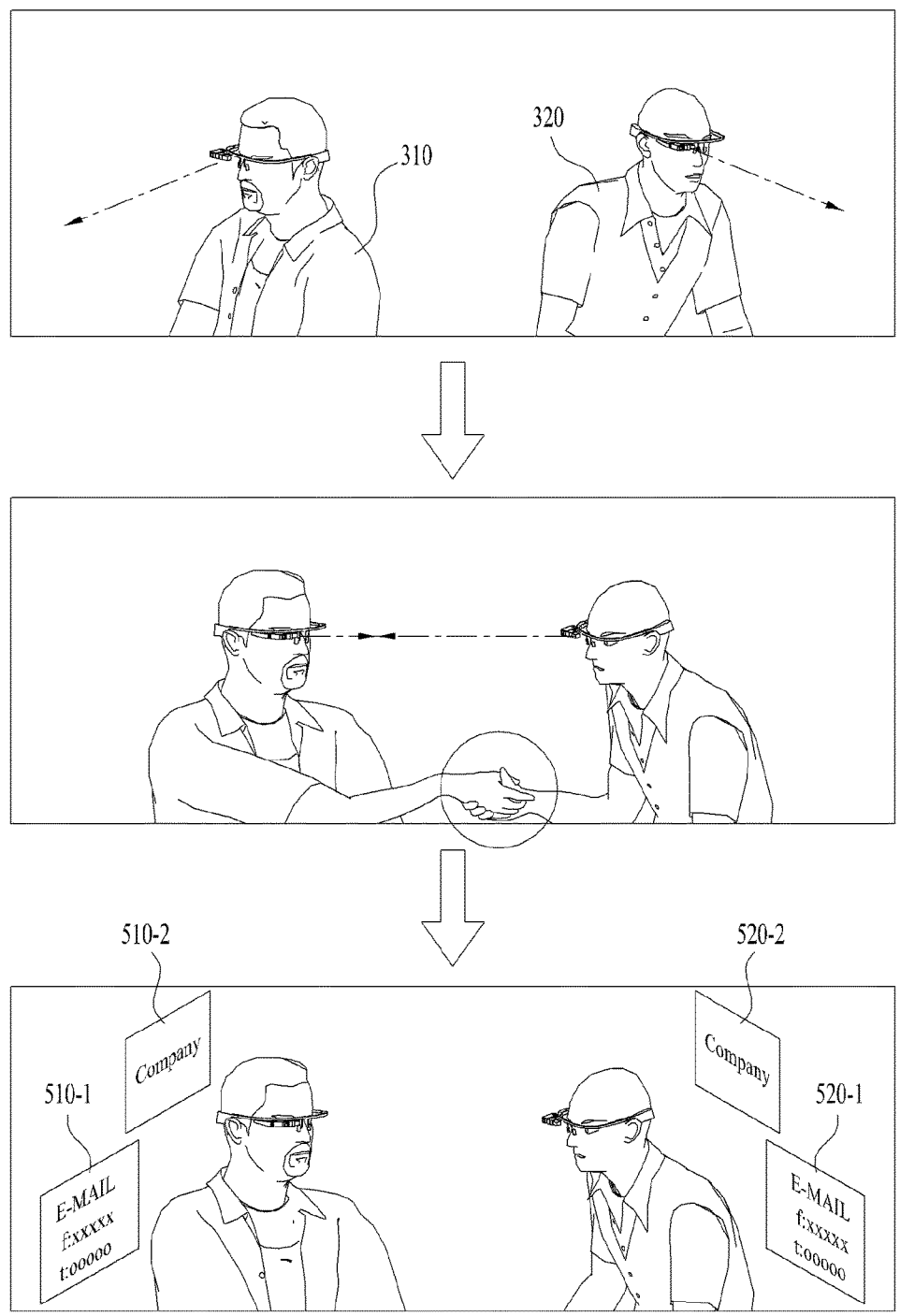

FIG. 5a and FIG. 5b are diagrams of a method for a wearable device to detect a real object and an interaction of the real object according to one embodiment of the present specification.

The wearable device 100 may detect a real object and a first interaction of the real object. In this case, as an example, the wearable device 100 detects the real object and may transmit a first triggering signal to an external device 200 based on the detected real object. In this case, if the wearable device 100 receives a second triggering signal, which is transmitted by the external device 200 based on the first triggering signal, the wearable device 100 may detect the first interaction. And, the external device 200 may detect the first interaction when the external device 200 transmits the second triggering signal to the wearable device 100. In particular, if the wearable device 100 and the external device 200 exchanges a triggering signal with each other using a communication unit, the wearable device 100 and the external device 200 may detect the first interaction.

In this case, as an example, referring to FIG. 5a, the wearable device 100 may detect a first audio input of the second user 320 using an audio input sensing unit. If the wearable device 100 detects the first audio input of the second user, the wearable device may transmit a first triggering signal to the external device 200. In this case, if the external device 200 detects a second audio input of the first user 310, the external device 200 may transmit a second triggering signal to the wearable device 100. In particular, if the wearable device 100 detects the first audio input of the second user 320 and the external device detects the second audio input of the first user 310, the wearable device 100 may detect the first interaction. In this case, the external device 200 may detect the first interaction as well.

As a different example, if the wearable device 100 detects the aforementioned first audio input and the second audio input, the wearable device may detect the first interaction. In particular, the wearable device 100 may detect the first interaction based on an audio input without a triggering signal.

As an example, referring to FIG. 5a, the wearable device 100 may detect such voice as "Hello, nice to meet you" as an audio input of the second user 320. In this case, the wearable device 100 may transmit a first triggering signal to the external device 200 based on the audio input of the second user. In this case, the external device 200 may detect such voice as "Hello, How do you do?" as an audio input of the first user 310. If the external device 200 detects the audio input of the first user 310 based on the received first triggering signal, the external device may transmit a second triggering signal to the wearable device 100. The wearable device 100 may detect the first interaction when the wearable device receives the second triggering signal. And, the external device 200 may detect the first interaction when the external device transmits the second triggering signal to the wearable device.

As a different example, referring to FIG. 5b, the wearable device 100 may detect a first gesture input of the second user 320 using a first camera unit. In this case, as an example, the first gesture input may correspond to a gesture of shaking a hand with the first user 310. And, if the wearable device 100 detects the first gesture input of the second user 320, the wearable device 100 may transmit a first triggering signal to the external device 200. In this case, if the external device 200 detects a second gesture input of the first user 310, the external device 200 may transmit a second triggering signal to the wearable device 100. In this case, as an example, the second gesture input may correspond to a gesture of shaking a hand with the second user 320. In particular, if the wearable device 100 detects the first gesture input of the second user 320 and the external device 200 detects the second gesture input of the first user 310, the wearable device 100 may detect the first interaction. In this case, the external device 200 may detect the first interaction as well.

As a further different example, the wearable device 100 may detect a gesture input based on an interaction between the first user 310 wearing the wearable device 100 and the second user 320. In this case, the gesture may correspond to a gesture of shaking a hand. And, as an example, the wearable device 100 may store information on a gesture. In this case, if a pre-stored gesture is identical to a detected gesture, the wearable device 100 may detect the first interaction.

As a further different embodiment, if the wearable device 100 detects a real object and a first interaction, the wearable device 100 may transmit an information request signal to the external device 200. In this case, the external device 200 may transmit virtual object information to the wearable device 100 based on the information request signal. The wearable device 100 may display a virtual object based on the virtual object information received from the external device 200. In particular, the wearable device 100 transmits the information request signal based on the first interaction, receives the virtual object information and may display the virtual object.

In particular, the wearable device 100 detects a first interaction and may display a virtual object related to a real object based on the detected first interaction, by which the present specification may be non-limited.

Figure 6A:
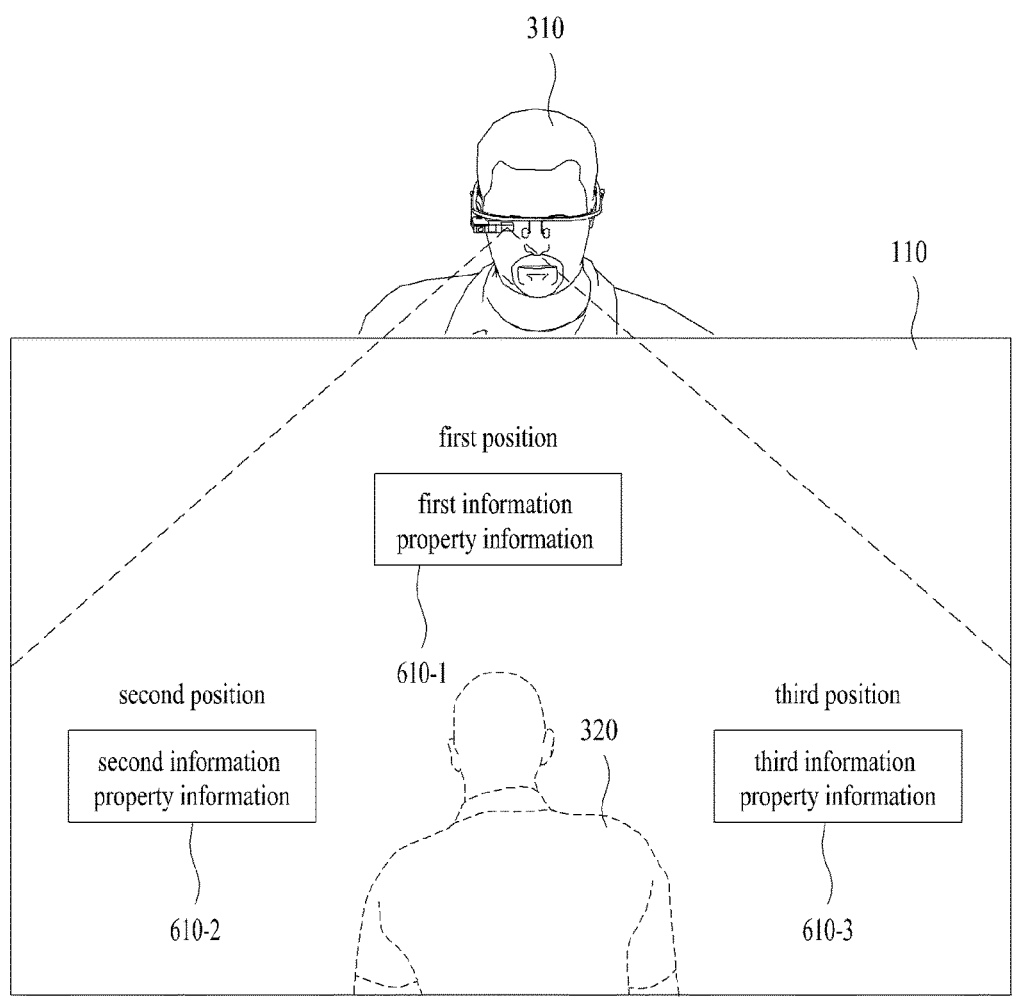
FIG. 6a and FIG. 6b are diagrams of a method for a wearable device to set information property in accordance with a display position of a virtual object according to one embodiment of the present specification.
Figure 6B:
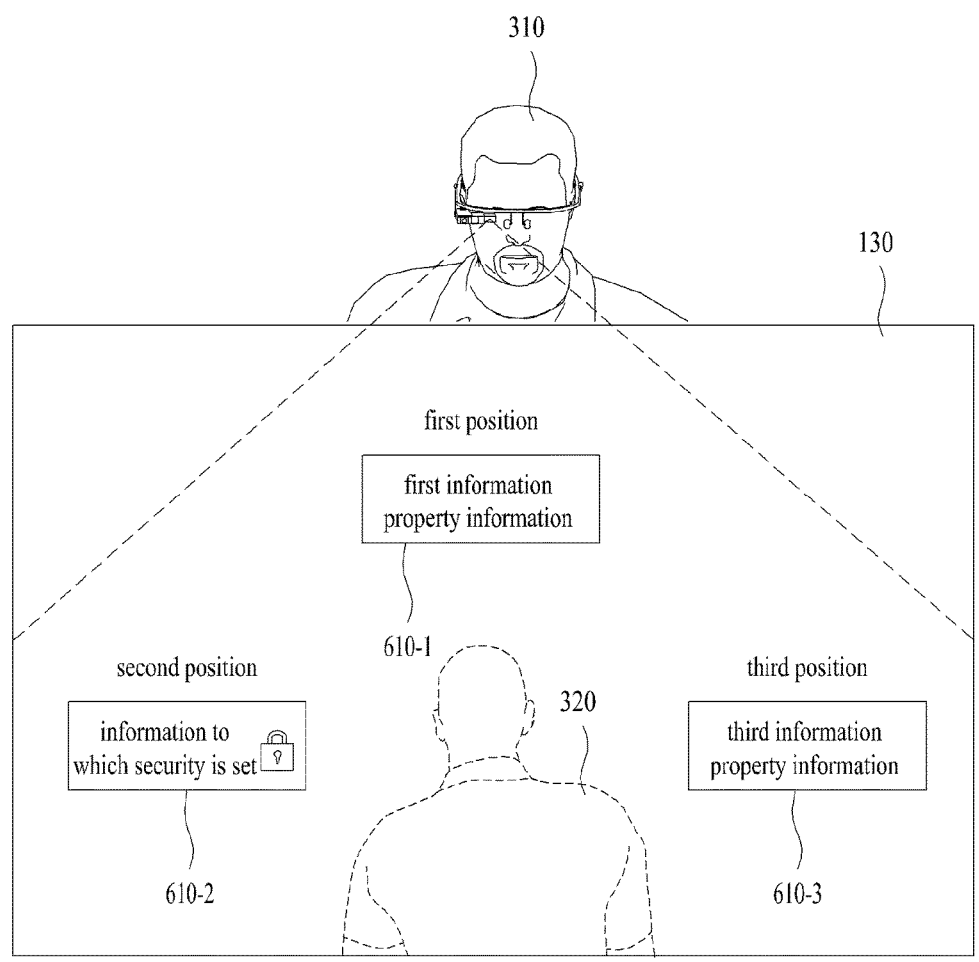

FIG. 6a and FIG. 6b are diagrams of a method for a wearable device to set information property in accordance with a display position of a virtual object according to one embodiment of the present specification.

The wearable device 100 may display a virtual object. In this case, as an example, the wearable device may differently configure information property of the virtual object based on a position in which the virtual object is displayed. As an example, the information property may include one selected from the group consisting of name information, telephone number information, E-mail information, address information and SNS information. And, the information property may be configured by a user or a processor 160, by which the present specification may be non-limited.

More specifically, referring to FIG. 6a, the wearable device 100 may display a first virtual object 610-1 including a first property in a first position of a display unit 110. In this case, as an example, the first position may be positioned at the top of a second user 320 corresponding to a real object. As an example, if the wearable device 100 detects a person as a real object, the wearable device 100 may display information including an identical information property on the top of the person. As an example, the first virtual object 610-1 may display name information and telephone number information. In particular, the wearable device 100 may display a name and a telephone number of the second user 320 on the top of the second user 320 based on virtual object information received from the external device 200. And, as an example, the wearable device 100 may display a second virtual object 610-2 including a second property in a second position of the display unit 110. And, the wearable device 100 may display a third virtual object 610-3 including a third property in a third position of the display unit 110. In this case, the second property and the third property may correspond to information properties different from each other. As an example, the second property may include E-mail information and SNS information. And, as an example, the third property may include company information. In particular, the wearable device 100 may display the E-mail information and the SNS information of the second user 320 at the left of the second user 320. And, the wearable device 100 may display the company information of the second user 320 at the right of the second user 320. By doing so, the wearable device 100 may make a user check disclosed information.

As a different example, referring to FIG. 6b, the virtual object 610-2 including the second property, which is displayed in the second position, may correspond to a virtual object indicating information to which security is set. More specifically, the wearable device 100 may receive virtual object information from the external device 200. In this case, as an example, the external device 200 may include information to which security is set in the virtual object information. In this case, the wearable device 100 may display the information to which security is set by the external device 200. In this case, the wearable device 100 may display the virtual object 610-2 indicating the information to which security is set as a virtual object.

As an example, the second user 320 sets security to E-mail information and SNS information and may not disclose the information. In this case, if the wearable device 100 receives virtual object information from the external device 200, the wearable device 100 may display a second virtual object 610-2 indicating the information to which security is set in the second position. By doing so, a user may set a limit on information to be disclosed.

Figure 7:
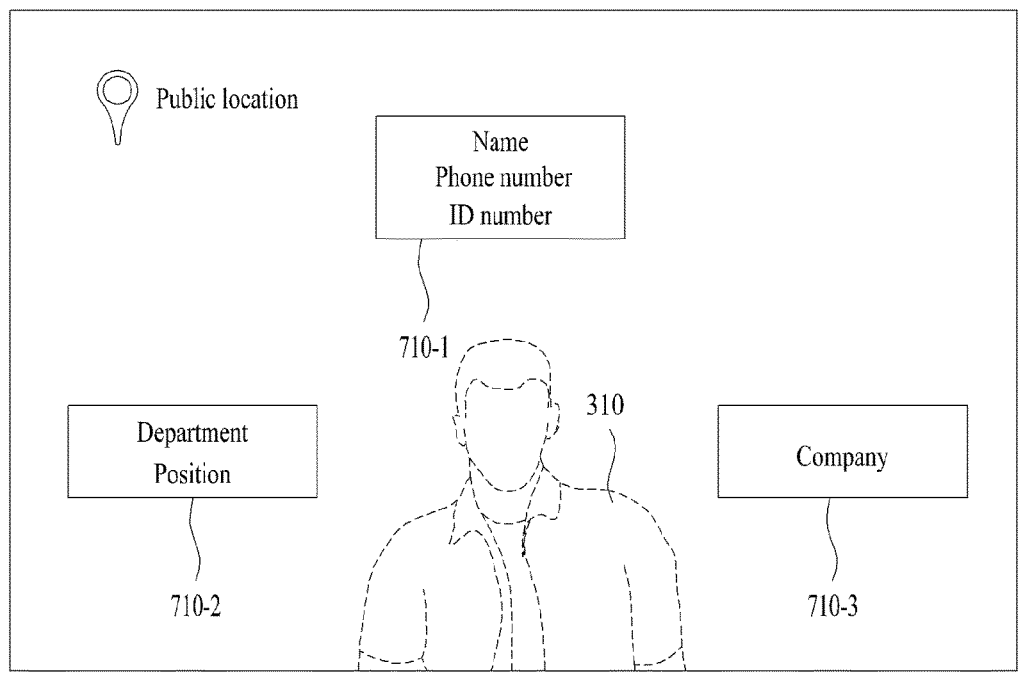
FIG. 7 is a diagram of a method for a wearable device to set information property based on location information of the wearable device according to one embodiment of the present specification.
Figure 7:
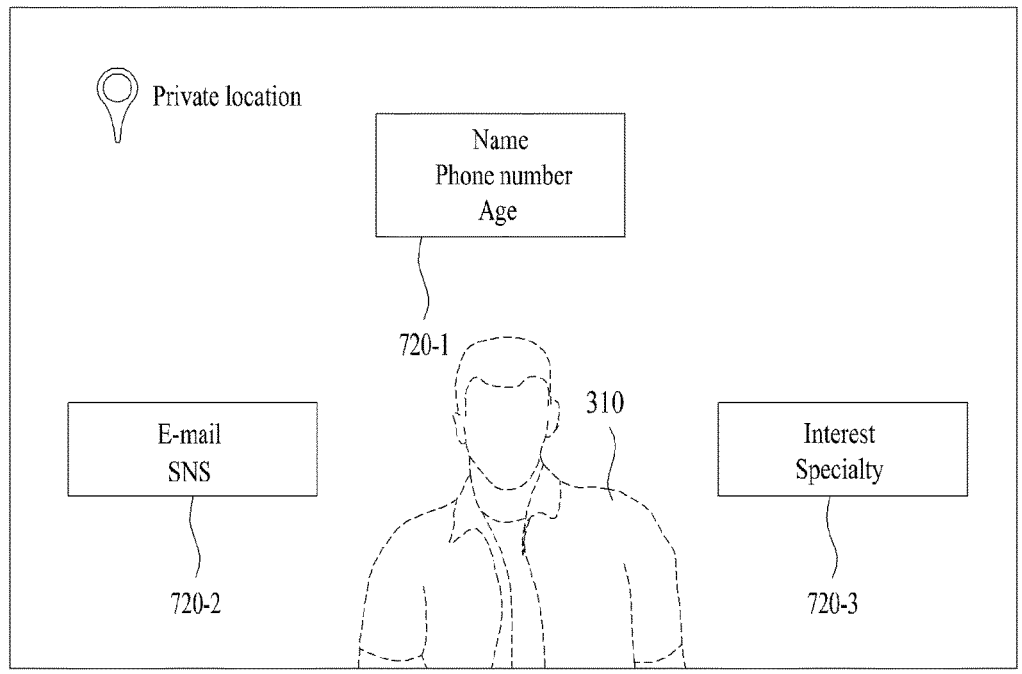

FIG. 7 is a diagram of a method for a wearable device to set information property based on location information of the wearable device according to one embodiment of the present specification. The wearable device 100 and the external device 200 may further include a location information receiving unit. And, the wearable device 100 and the external device 200 may receive current location information. In this case, as an example, if it is detected that the wearable device 100 and the external device 200 are located at a first location, the wearable device 100 may display a virtual object including a first information property. In this case, as an example, the first location may correspond to a region including an error. As an example, the first location may correspond to a company, a school, a street, a playground or the like. In particular, the first location may correspond to a relatively large region, by which the present specification may be non-limited.

In this case, the aforementioned information property may correspond to a public property or a private property. In this case, as an example, the information property may correspond to a property configured by a user or a processor 160. And, as an example, the public property may correspond to a property related to a public service of a user. As an example, the public property may correspond to company information, department information on a company and the like. And, as an example, the private property may correspond to information on a private content of a user. As an example, the private property may correspond to E-mail information, SNS information, hobby information, specialty information and the like. In this case, as an example, the user may change/configure the public property and the private property, by which the present specification may be non-limited.

And, as an example, referring to FIG. 7, the wearable device 100 may display a virtual object including a first information property in a first location. And, the wearable device 100 may display a virtual object including a second information property in a second location. In this case, as an example, the first location may correspond to an inside of a company of a first user 310. And, the second location may correspond to a café in which a meeting of the first user 310 is taking place. In this case, as an example, the first information property may correspond to a public property. And, the second information property may correspond to a private property. In this case, the wearable device 100 may display a virtual object indicating name information, telephone number, information, company ID information, department information and company information in the first location. And, the wearable device 100 may display a virtual object indicating name information, telephone number information, age information, E-mail information, SNS information, hobby information and specialty information in the second location. In particular, the wearable device 100 may determine an information property of a virtual object based on location information of the wearable device 100. In this case, as an example, the information property of the virtual object displayed by the wearable device 100 may be determined based on virtual object information of the external device 200. More specifically, as mentioned in the foregoing description, the wearable device 100 may receive the virtual object information from the external device 200.

And, as an example, the wearable device 100 may display a virtual object based on received virtual object information. In this case, if the wearable device 100 and the external device 200 are positioned at a first location, the external device 200 may transmit first virtual object information to the wearable device 100 based on a public property. And, if the wearable device 100 and the external device 200 are positioned at a second location, the external device 200 may transmit second virtual object information to the wearable device 100 based on a private property. In particular, the wearable device may display a virtual object based on an information property of virtual object information transmitted by the external device 200.

Figure 8:
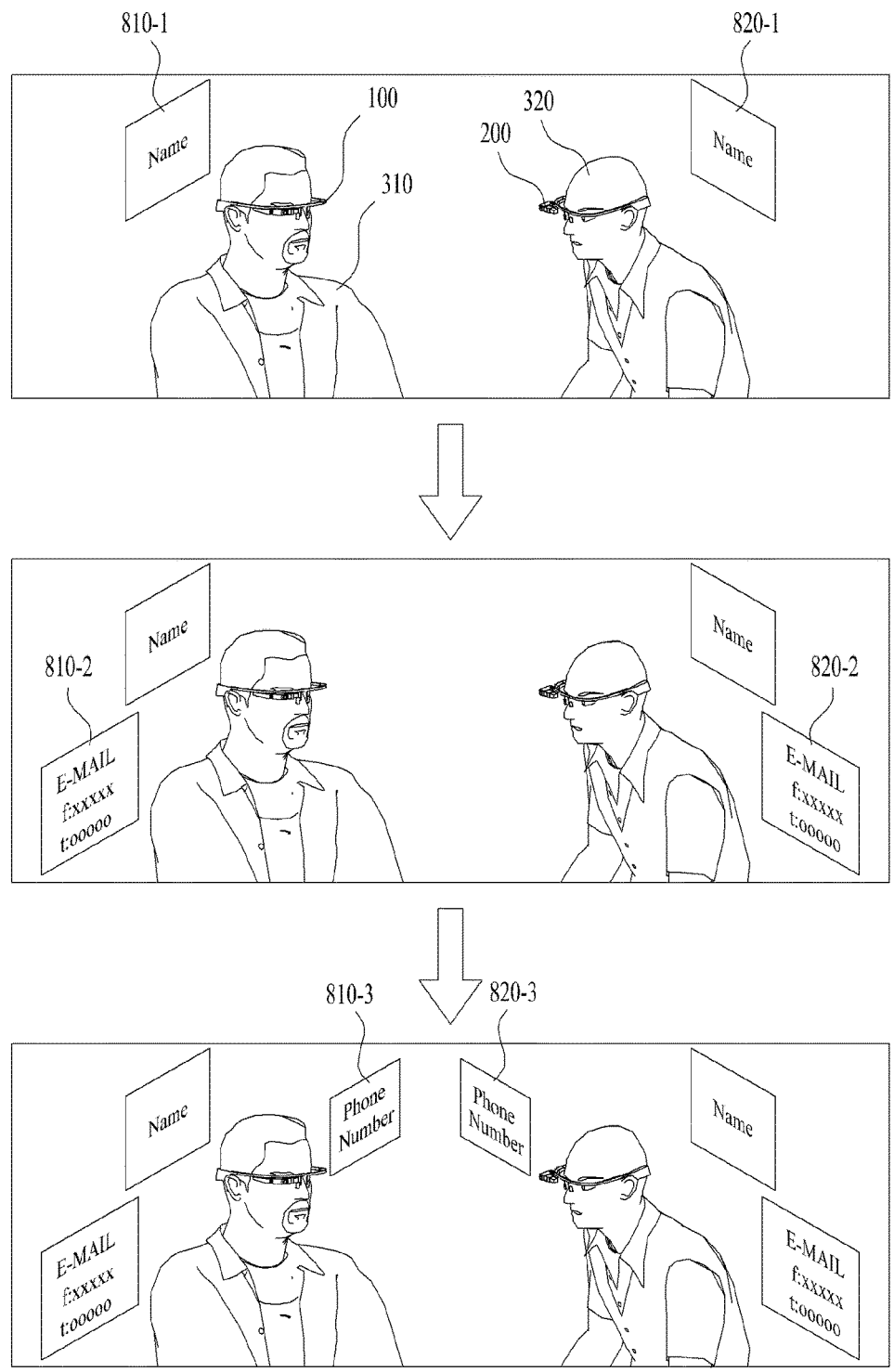
FIG. 8 is a diagram for a method for a wearable device to disclose a virtual object in stages according to one embodiment of the present specification.

FIG. 8 is a diagram for a method for a wearable device to disclose a virtual object in stages according to one embodiment of the present specification. The wearable device 100 may include a storage unit storing address information. In this case, the address information may correspond to information configured by a user or a processor. As an example, the address information may correspond to telephone number information and information in which a name of a user is stored. In this case, the wearable device 100 may display a virtual object based on the address information. More specifically, as mentioned in the foregoing description, the wearable device may detect a first interaction. In this case, the wearable device 100 may transmit first virtual object information to the external device 200. And, the wearable device 100 may receive second virtual object information from the external device 200. The wearable device 100 may display a virtual object based on the received second virtual object information. And, the external device 200 may display a virtual object based on the received first virtual object information.

In this case, as an example, referring to FIG. 8, the wearable device 100 may display a virtual object in stages. More specifically, if the wearable device 100 detects the first interaction, the wearable device may display a first virtual object 810-1. And, the external device 200 may display a second virtual object 820-1. In this case, the first virtual object 810-1 may correspond to name information and telephone number information of a second user 320. And, the second virtual object 820-1 may correspond to name information and telephone number information of a first user 310. In this case, if the name information and the telephone number information of the second user 320 are included in address information, the wearable device 100 may transmit third virtual object information including additional information to the external device 200. And, the wearable device 100 may receive fourth virtual object information including additional information from the external device 200. In this case, the wearable device 100 may further display a third virtual object 810-2 based on the received fourth virtual object information. And, the external device 200 may further display a fourth virtual object 820-2 based on the received third virtual object information.

In particular, the wearable device 100 and the external device 200 may set a limit on a disclosed virtual object information via additional information or an additional authentication, by which the present specification may be non-limited.

Figure 9:
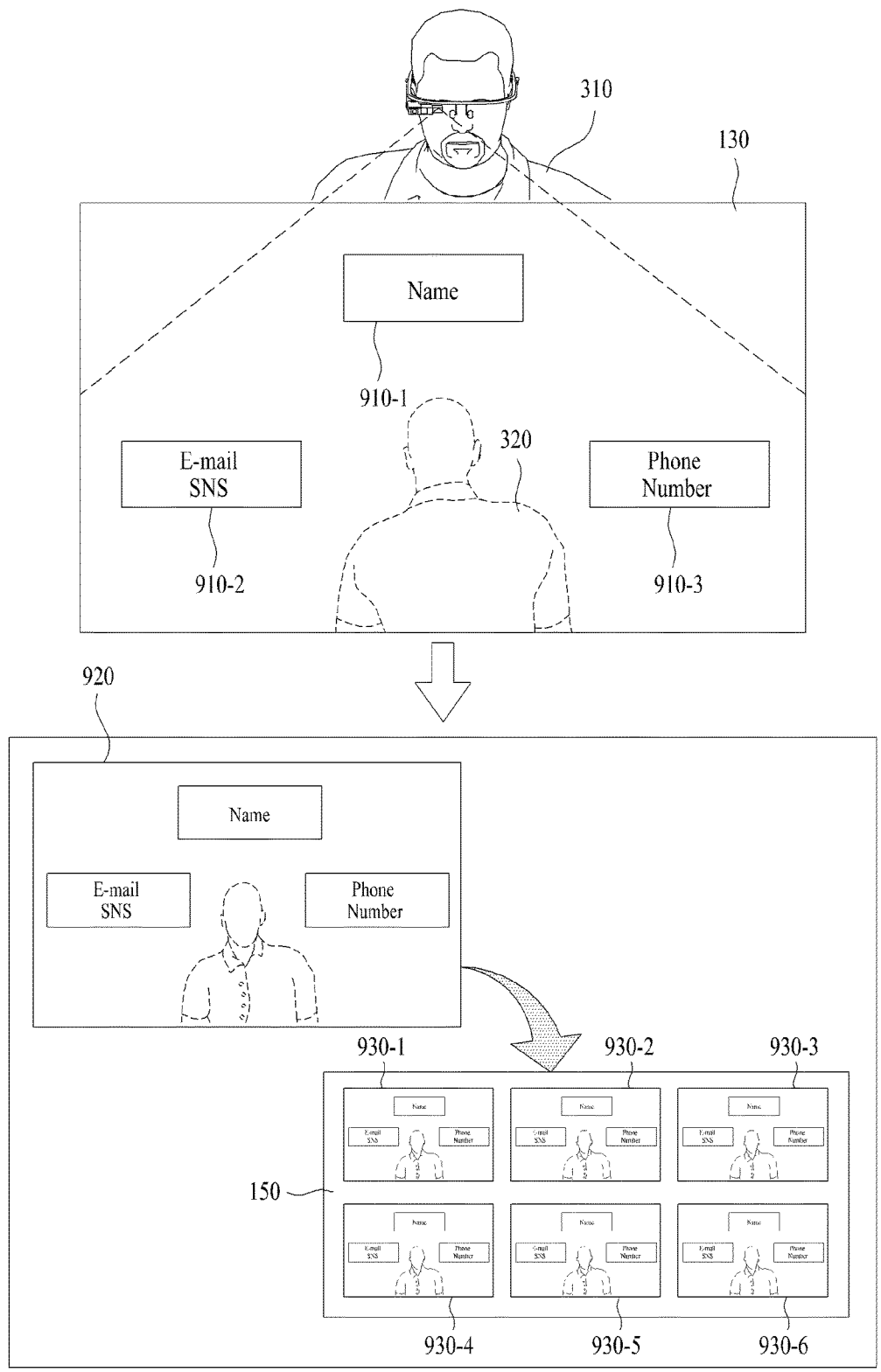
FIG. 9 is a diagram of a method for a wearable device to store name card information according to one embodiment of the present specification.

FIG. 9 is a diagram of a method for a wearable device to store name card information according to one embodiment of the present specification.

The wearable device 100 may further store name card information in a storage unit. In this case, as an example, the name card information may include image information of a second user 320 and virtual object information related to the second user. More specifically, if the wearable device 100 detects a real object and a first interaction, the wearable device may display a virtual object for a second user 320. In this case, the wearable device 100 may store the real object and the displayed virtual object as a first name card information. In particular, the wearable device 100 may store the real object and the virtual object information displayed in the display unit 110. In this case, as an example, the wearable device 100 may store a plurality of name card information.

As an example, referring to FIG. 9, the wearable device 100 may store a second user and a virtual object related to the second user as a first name card information 930-1. And, the wearable device 100 may store a third user and a virtual object related to the third user as a second name card information 930-2. And, the wearable device 100 may store a plurality of name card information 930-1/930-2/930-3/930-4/930-5/930-6, by which the present specification may be non-limited. By doing so, a user wearing the wearable device 100 may store information on a real object and a virtual object.

And, as an example, the wearable device 100 may detect a second user and a first interaction of the second user in a state that the first name card information 930-1 is stored in the storage unit. In this case, the wearable device 100 may transmit updated virtual object information to the external device 200. And, the wearable device 100 may receive updated virtual object information from the external device 200. In this case, the wearable device 100 may update the first name card information 930-1 based on the updated virtual object information. By doing so, the wearable device 100 may store updated name card information.

Figure 10:
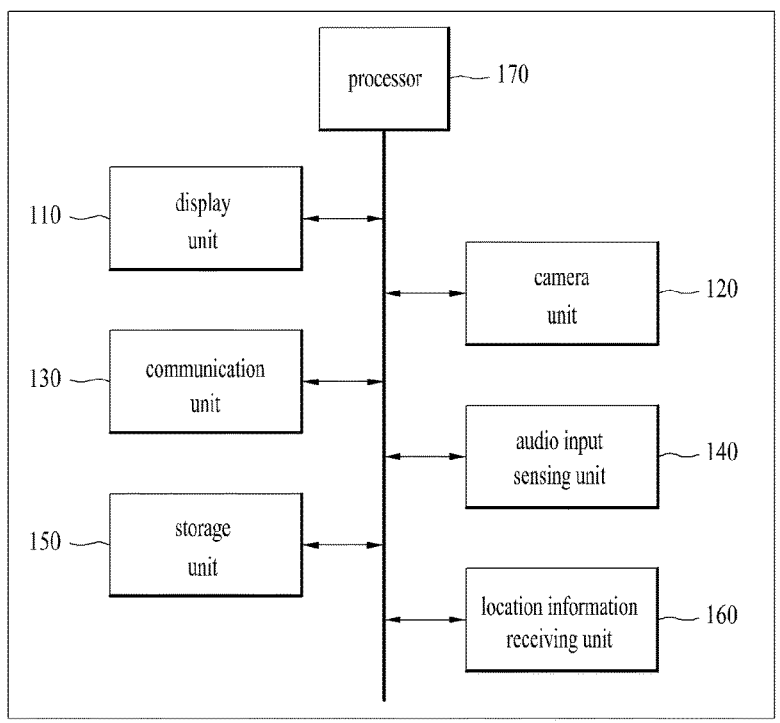
FIG. 10 is a block diagram for a wearable device and an external device according to one embodiment of the present specification.
Figure 10:
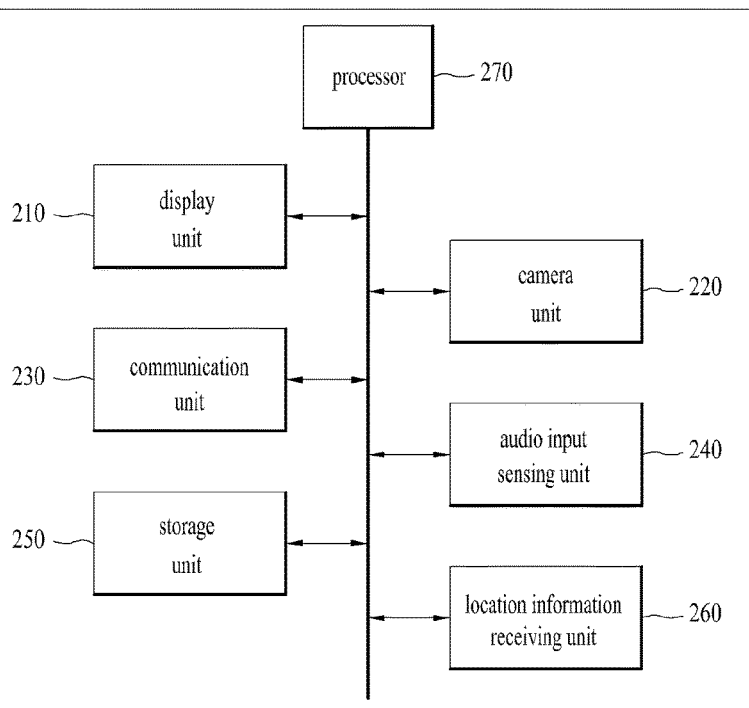

FIG. 10 is a block diagram for a wearable device and an external device according to one embodiment of the present specification.

As mentioned in the foregoing description, the wearable device may correspond to a HMD device, a smart lens or the like. And, as mentioned in the foregoing description, the external device 200 may correspond to a device of a type identical to the wearable device 100 or a device compatible with the wearable device. As an example, the wearable device 100 may include a display unit 110, a camera unit 120, a communication unit 130 and a processor 170. And, as an optional configuration, the wearable device 100 may include at least one selected from the group consisting of an audio input sensing unit 140, a storage unit 150 and a location information receiving unit 160. And, the external device 200 may include a display unit 210, a camera unit 220, a communication unit 230 and a processor 270. And, as an optional configuration, the external device 200 may include at least one selected from the group consisting of an audio input sensing unit 240, a storage unit 250 and a location information receiving unit 260. In particular, the external device 200 may correspond to a device capable of executing an identical operation based on configuration elements identical to the wearable device 100. In the following, each of the configuration elements is described on the basis of the wearable device 100.

The display unit 110 may display a virtual object. In this case, the virtual object may correspond to a graphic user interface provided to a user via the display unit 110. And, the display unit 110 may display a virtual object using an augmented reality technology. And, as an example, the display unit may correspond to a see-through unit 110. In particular, a user wears the wearable device 100 and may detect a real object through the display unit 110. In this case, the wearable device 110 may display a virtual object corresponding to the real object detected in the display unit 110.

The camera unit 120 may sense an image and capture the image. And, as an example, the wearable device 100 may detect a real object using the camera unit 120. More specifically, the wearable device 100 may detect a real object via the display unit using the camera unit 120. And, as an example, the camera unit 120 may detect the front direction of a camera unit of the external device. As mentioned in the foregoing description, the wearable device 100 may detect a first interaction based on the front direction of the camera unit 120. And, the camera unit 120 may detect a gesture input. More specifically, the camera unit 120 may detect a gesture of a real object. In this case, as mentioned in the foregoing description, if a gesture input is identical to a predetermined gesture input, the wearable device 100 may detect an interaction.

And, as an example, the camera unit 120 may include at least one selected from the group consisting of an infrared sensor, an ultrasonic sensor, a proximity sensor and an illumination sensor. In particular, the camera unit 120 may include a sensor detecting a real object, by which the present specification may be non-limited.

The communication unit 130 may communicate with the external device 200. More specifically, the wearable device 100 may transmit virtual object information to the external device 200 using the communication unit 130. And, as an example, the wearable device 100 may receive virtual object information transmitted by the external device 200 using the communication unit 130. In particular, the wearable device 100 performs communication with the external device 200 and may share data with the external device 200. By doing so, the wearable device 100 receives information on a user wearing the external device 200 and may display a virtual object related to the user. In particular, the communication unit 130 performs a communication using various protocols between the wearable device 100 and the external device 200 and may transmit and receive data using the protocols. And, the communication unit 130 accesses a network in wired or wireless and may transmit and receive digital data such as content and the like.

The wearable device may further include the audio input sensing unit 140. In this case, the audio input sensing unit may correspond to an optional configuration. As an example, the wearable device 100 may detect an audio input via the audio input sensing unit 140. In this case, as mentioned in the foregoing description, the wearable device 100 may detect a first interaction based on the audio input sensing unit 140. In particular, the wearable device 100 may detect a real object and an interaction of the real object via the audio input sensing unit 140, by which the present specification may be non-limited. In this case, as an example, the audio input sensing unit 140 may include a voice recognition sensor.

And, the wearable device 100 may further include the storage unit 150 as an optional configuration. In this case, as an example, the wearable device 100 may store address information in the storage unit 150. And, as an example, the wearable device 100 may store name card information in the storage unit 150. And, the storage unit 150 may store such various digital data as a video, an audio, an image, an application and the like. And, as an example, the storage unit 150 may store a program for controlling the processor 170 and may perform a function of temporarily storing input/output data. The storage unit 150 may include such various data storage spaces as a flash memory, a RAM (random access memory), an SSD (solid state drive) and the like. In particular, the storage unit 150 may correspond to a unit capable of storing data or information, by which the present specification may be non-limited.

And, the wearable device 100 may further include the location information receiving unit 160 as an optional configuration. In this case, as an example, the wearable device 100 may receive location information of the wearable device 100 using the location information receiving unit 160. In this case, as mentioned in the foregoing description, the wearable device 100 may configure an information property of a virtual object based on the received location information. As an example, as mentioned in the foregoing description, the information property may correspond to a public property or a private property. As an example, the location information receiving unit 160 may include a GPS and may receive location information of the wearable device 100 via a satellite. And, the location information receiving unit 160 may correspond to a unit receiving the location information of the wearable device 100 using a local area network or base station information. In particular, the location information receiving unit 160 may correspond to a unit receiving the location information of the wearable device 100, by which the present specification may be non-limited.

The processor 170 may correspond to a unit controlling at least one selected from the group consisting of the display unit 110, the camera unit 120 and the communication unit 130. And, the processor 160 may correspond to a unit controlling at least one selected from the consisting of the audio input sensing unit 140, the storage unit and the location information receiving unit as optional configurations.

More specifically, the processor 170 may detect a real object positioned at the front direction of the wearable device 100 using the camera unit 120. In this case, if the wearable device 100 detects the real object, the processor 170 may display a first virtual object. And, if the wearable device 100 detects the real object and a first interaction of the real object, the processor 170 may display a second virtual object. In this case, the first virtual object may correspond to an object different from the second virtual object. And, as an example, the processor 170 may exchange virtual object information with the external device 200 using the communication unit 130. As an example, the processor may display the second virtual object based on the virtual object information transmitted by the external device 200 based on the first interaction of the real object. In this case, the processor 170 may display the virtual object using the display unit 110. And, as an example, the processor 17 may detect the first interaction of the real object based on an audio input using the audio input sensing unit 140. If the processor 170 detects the first interaction of the real object, the processor 170 may display the aforementioned second virtual object. And, as an example, the processor 170 may store at least one of address information and name card information in the storage unit 150. And, the processor 170 may receive location information of the wearable device 100 using the location information receiving unit 160. In this case, the processor 170 may configure an information property of a virtual object, which is displayed based on the location information of the wearable device 100. And, as an example, the processor 170 may configure an information property of a virtual object, which is transmitted to the external device 200 based on the location information of the wearable device 100. In this case, as an example, virtual object information may correspond to information necessary for the wearable device 100 to display a virtual object. In particular, the processor 170 may transmit the virtual object information related to the virtual object to the external device to make the external device 200 display the virtual object. And, the processor 170 may display a virtual object in the display unit 110 using virtual object information received from the external device 200. In particular, the virtual object information may correspond to information corresponding to the displayed virtual object.

Figure 11:
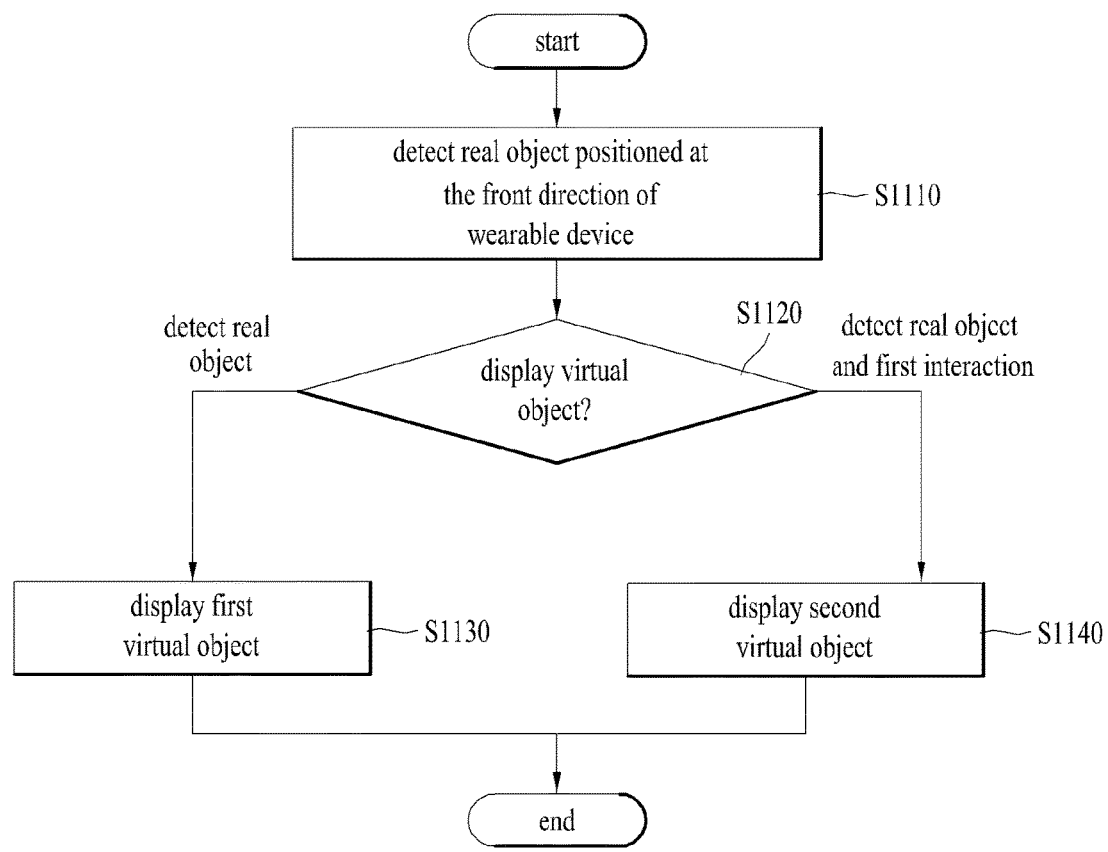
FIG. 11 is a flowchart for a method of controlling a wearable device according to one embodiment of the present specification.

FIG. 11 is a flowchart for a method of controlling a wearable device according to one embodiment of the present specification.

The wearable device 100 may detect a real object positioned at the front direction of the wearable device 100 [S1110]. In this case, as mentioned earlier in FIG. 10, the wearable device 100 may detect the real object using the camera unit 120.

Subsequently, the wearable device 100 may display a virtual object [S1120]. In this case, as mentioned earlier in FIG. 1, the virtual object may correspond to visual information related to the real object. And, the virtual object may correspond to a graphic user interface provided to a user by the display unit 110. And, the display unit 110 may display the virtual object using an augmented reality technology.

Subsequently, if the wearable device 100 detects a real object only, the wearable device 100 may display a first virtual object [S1130]. And, if the wearable device 100 detects a real object and a first interaction of the real object, the wearable device 100 may display a second virtual object [S1140]. In this case, as mentioned earlier in FIG. 3, the first virtual object and the second virtual object may correspond to virtual objects different from each other. And, the second virtual object may correspond to a virtual object which is displayed based on virtual object information transmitted by the external device 200. In particular, the wearable device 100 may display virtual object different from each other when the wearable device detects the real object only and the wearable device detects both the real object and the first interaction of the real object, respectively.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A wearable device 100 according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a wearable device 100 according to the present specification and a method of controlling therefor may be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor may be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations may be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions may be complementally applied, if necessary.

What is claimed is:

1. A head mounted display device, comprising:
a display configured to display a virtual object;
a first camera configured to detect a real object from a front direction of the head mounted display device;
a communication unit configured to transmit first virtual object information to an external device based on the detected real object and receive second virtual object information from the external device;
a location information receiver configured to receive location information of the head mounted display device; and
a processor configured to control the display, the first camera and the communication unit,
wherein the processor is further configured to:
display a first virtual object based on the detected real object when the real object is detected, wherein the first virtual object includes information concerning a type of the real object and the information concerning the type of the real object is recognized by using a captured image by the first camera,
if a security is set to a second virtual object at a first location and the location information corresponds to a second location, display a second virtual object when the real object and a first interaction are detected, wherein the first location differs from the second location, the second virtual object corresponds to a virtual object displayed based on the second virtual object information transmitted by the external device and the second virtual object includes personal information of the real object, and
if the security is set to the second virtual object at the first location and the location information corresponds to the first location, display a third virtual object instead of the second virtual object when the real object and the first interaction are detected, wherein the third virtual object indicates information to which security is set.

2. The head mounted display device of claim 1, wherein the processor is further configured to detect the first interaction when a first triggering signal is transmitted to the external device based on the detected real object and a second triggering signal transmitted by the external device is received based on the first triggering signal.

3. The head mounted display device of claim 2, further comprising an audio input sensor configured to detect an audio input,
wherein the processor is further configured to transmit the first triggering signal to the external device when a first audio input of the detected real object is detected.

4. The head mounted display device of claim 3, wherein the external device is configured to transmit the second triggering signal to the head mounted display device when a second audio input of a user wearing the head mounted display device is detected.

5. The head mounted display device of claim 2, wherein the first camera is further configured to detect a gesture input, and
wherein the processor is further configured to transmit the first triggering signal to the external device when a first gesture input of the real object is detected.

6. The head mounted display device of claim 5, wherein the external device is configured to transmit the second triggering signal to the head mounted display device when a second gesture input of a user wearing the head mounted display device is detected.

7. The head mounted display device of claim 1, wherein the first camera is further configured to detect a front direction of a second camera included in the external device, and
wherein the processor is further configured to detect the first interaction when the front direction of the second camera corresponds to a direction facing the front direction of the first camera.

8. The head mounted display device of claim 1, wherein the processor is further configured to transmit the first virtual object information to the external device when the real object and the first interaction are detected.

9. The head mounted display device of claim 8, further comprising a storage configured to store address information,
wherein the processor is further configured to:
transmit fourth virtual object information to the external device based on first address information when the detected real object corresponds to an object corresponding to pre-stored first address information, and
transmit fifth virtual object information to the external device based on second address information when the detected real object corresponds to an object corresponding to the pre-stored second address information.

10. The head mounted display device of claim 1, wherein the processor is further configured to:
transmit the first virtual object information including a first information property to the external device when the head mounted display device is positioned at a first location based on the received location information, and
transmit the first virtual object information including a second information property to the external device when the head mounted display device is positioned at a second location based on the received location information,
wherein the first information property is different from the second information property.

11. The head mounted display device of claim 10, wherein the information property corresponds to one of a public property and a private property.

12. The head mounted display device of claim 1, wherein the processor is further configured to transmit an information request signal to the external device when the real object and the first interaction are detected, and
wherein the external device is further configured to transmit the second virtual object information to the head mounted display device when the information request signal is received.

13. The head mounted display device of claim 1, further comprising a storage device configured to store name card information,
wherein the processor is further configured to generate the name card information using the detected real object and the second virtual object information received from the external device.

14. The head mounted display device of claim 13, wherein the processor is further configured to transmit fourth virtual object information updated from the first virtual object information to the external device when the real object and the first interaction are detected in a state that first name card information corresponding to the real objet is stored in the storage device.

15. The head mounted display device of claim 1, wherein the processor is further configured to:
if the virtual object is displayed,
display the virtual object in a first position on the display when an information property of the virtual object is a first property, and
display the virtual object in a second position on the display when the information property of the virtual object is a second property.

16. The head mounted display device of claim 15, wherein the information property comprises at least one selected from the group consisting of name information, telephone number information, E-mail information, address information and company information.

17. The head mounted display device of claim 1, wherein the virtual object corresponds to a graphic user interface provided to a user by the display, and
wherein the display is configured to display the virtual object using an augmented reality technology.

18. A method of controlling a head mounted display device, comprising:
receiving, via a location information receiver of the head mounted display device, location information of the head mounted display device,
detecting, via first camera of the head mounted display device, a real object and a first interaction,
displaying, via a processor of the head mounted display device, a first virtual object based on the detected real object when the real object is detected, wherein the first virtual object includes information concerning a type of the real object and the information concerning the type of the real object is recognized by using a captured image by the first camera,
if a security is set to a second virtual object at a first location and the location information corresponds to a second location, displaying, via the processor, a second virtual object when the real object and the first interaction are detected, wherein the first location differs from the second location, the second virtual object corresponds to a virtual object displayed based on the second virtual object information transmitted by the external device and the second virtual object includes personal information of the real object, and
if the security is set to the second virtual object at the first location and the location information corresponds to the first location, displaying, via the processor, a third virtual object instead of the second virtual object when the real object and the first interaction are detected, wherein the third virtual object indicates information to which security is set.

* * * * *